United States Patent [19]

Ruzicka

[11] 4,072,336
[45] Feb. 7, 1978

[54] VACUUM SPOILER FOR PICKUP

[76] Inventor: Leo J. Ruzicka, 4804-19th St., Lubbock, Tex. 79407

[21] Appl. No.: 738,165

[22] Filed: Nov. 1, 1976

[51] Int. Cl.² ............................................. B62D 35/02
[52] U.S. Cl. ................................... 296/1 S; 180/1 FV
[58] Field of Search ..................... 296/1 S, 91; 98/2; 105/2 R

[56] References Cited
U.S. PATENT DOCUMENTS 1,923,349  8/1933  Wolverton ........................... 296/1 S
2,241,755  5/1941  Zaccone .............................. 296/1 S Primary Examiner—Joseph F. Peters, Jr.
Assistant Examiner—R. Schrecengost
Attorney, Agent, or Firm—Wendell Coffee

[57] ABSTRACT

A slot is cut through the front of the floor of a pickup bed from side to side. Air flowing upward through the slot at high speeds spoils the vacuum behind the cab and front gate; therefore, gas milage is increased and the lift on the bed is reduced.

4 Claims, 4 Drawing Figures

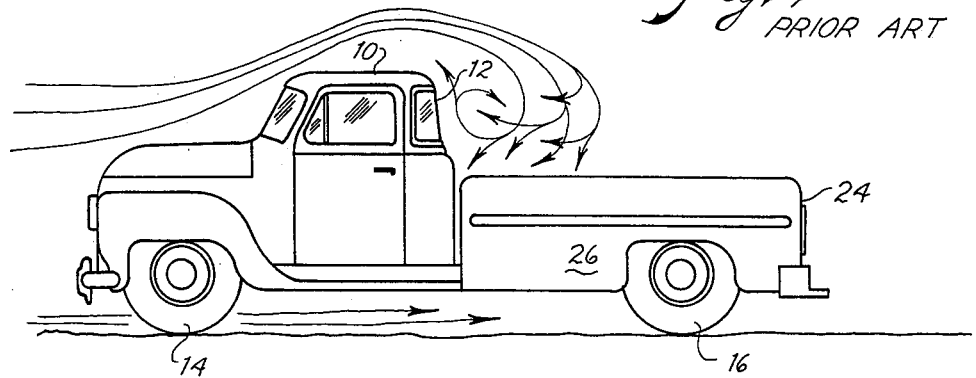
Fig. 1: PRIOR ART
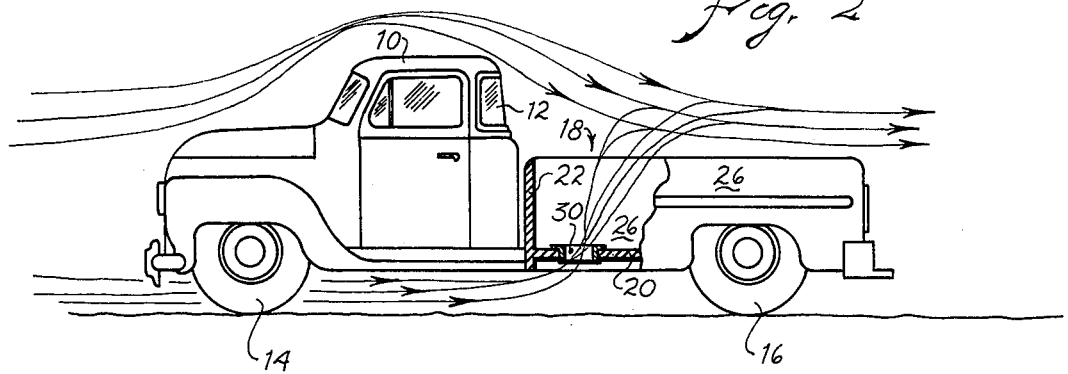
Fig. 2
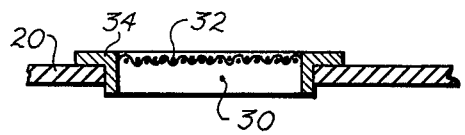
Fig. 4
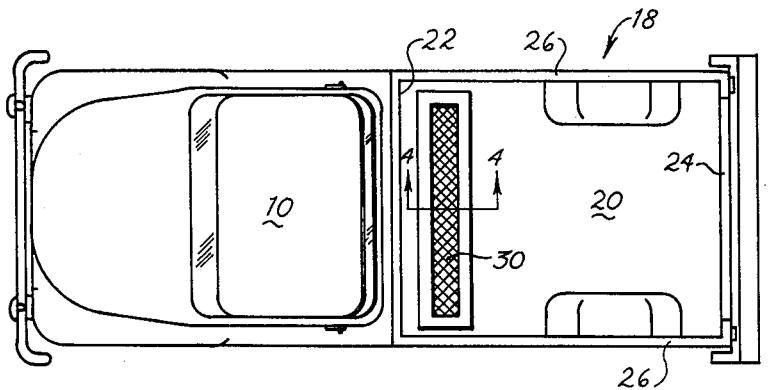
Fig. 3

VACUUM SPOILER FOR PICKUP

BACKGROUND OF THE INVENTION

1. Field of the Invention

This invention relates to the bodies of pickup trucks and more particularly to streamline shapes therefor.

2. Description of the Prior Art

Pickup trucks are common vehicles today. Not only are they used in small commercial firms and establishments and in agriculture, buth they have a certain appeal to sportsmen.

In general, a pickup truck has a cab with a straight back. There is a pickup bed having a front gate, side walls and a tail gate. The aerodynamics of a pickup truck are very poor. Therefore, particularly at higher speeds, they obtain very poor gas milage because of its poor aerodynamic qualities.

On large trucks, certain efforts have been made to provide deflectors between the cab and trailers of semi-trucks. Other workers in the field have provided wind deflectors on dump trucks to prevent blowing sand from the truck. Woodward, U.S. Pat. No. 3,819,222.

Efforts have been made to reduce the drag at the rear of automobiles. Typical examples of these efforts are WOLVERTON, U.S. Pat. No. 1,923,349, STALKER, U.S. Pat. No. 2,037,942, and JOUSSERANDOT, U.S. Pat. No. 3,029,862.

SUMMARY OF THE INVENTION

1. New and Different Function

I have solved the problem of the drag of an empty pickup resulting from the straight back of the cab and the front gate of the bed by providing an air slot or hole in the front of the floor of the pickup. This slot permits air to flow from underneath the pickup into this area behind the cab and bed, thus breaking or spoiling the vacuum. This improves the aerodymamics of the empty pickup. The end result is twofold: first, it decrease fuel consumption and, second, it decreases the lift. A standard empty pickup tends to have a lift on the bed which reduces the weight on the rear tires and in turn reduces traction. Installation of this slot reduces the lift and, therefore, puts the full weight on the rear tires. The slot also reduces noise.

Therefore, it may be seen that great results are obtained. The results of the total combination is far greater than the sum of the functions of each of the individual parts.

2. Objects of the Invention

An object of this invention is to improve the aerodynamics of an empty pickup.

Other objects are to improve fuel comsumption and rear wheel traction.

Further objects are to achieve the above with a device that is sturdy, compact, durable, lightweight, simple, safe, efficient, versatile, and reliable, yet inexpensive and easy to manufacture, install, adjust, and maintain, and no moving parts.

Even further objects are to achieve the above with a method that is versatile, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

BRIEF DESCRIPTION OF THE DRAWING

FIG. 1 is a side elevational view of a pickup of the PRIOR ART with arrows showing air flow.

FIG. 2 is a side elevation of a pickup with the front of the bed in section showing an embodiment of my invention thereon with arrows showing air flow.

FIG. 3 is a top plan view of a pickup with my invention thereon.

FIG. 4 is a sectional view taken substantially on line 4—4 of FIG. 3.

DESCRIPTION OF THE PREFERRED EMBODIMENT

Referring to the drawing, there may be seen a typical pickup. Such pickup has cab 10. The cab will have straight back 12. By "straight back" I mean that it is basically a planer surface and basically vertical.

Also, the pickup will have front wheels 14 and rear wheels 16. The pickup will have bed 18. The bed will include floor 20, front gate 22, tail gate 24 and side walls 26. The bed 18, obviously, forms a box-like structure. The bed is adjacent to the straight back of the cab. Although occasionally there is some clearance between the back of the cab 12 and the front gate 22, this is not always the case.

Those skilled in the art will understand that what has been described to this point and shown in FIG. 1 is conventional, old and commercially on the market. The arrows of the PRIOR ART pickup show the turbulence or vacuum behind the cab and front gate.

I have improved the aerodynamics of a pickup by cutting slot 30 through the front of the bed floor 20 from side to side. The slot provides a vent, opening or a hole through the pickup floor so that air from beneath the pickup can flow upward through the hole to spoil the vacuum or to provide a smooth air flow at the back of the pickup cab and behind the front gate of the bed. I have had good success in placing this slot in the front one-fourth of the length of the floor 20. Also, I have had good success having the slot extend at least three-fourths the distance from side wall to side wall.

To prevent material in the pickup bed from falling through the slot 30, it is desirable to place a screen in the slot. This has been represented in FIG. 3, showing screen 32 in the slot 30. The screen is conveniently attached to flange 34 extending along the edges of the slot. A plate may be provided to use over the slot in the event granular material such as grain is to be carried in the pickup.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:

1. In a pickup truck having
  a. a cab with a straight back thereto, and
  b. a bed with (i) side walls and
(ii) a floor having a front next to the cab,
c. said bed adjacent the straight back of the cab, THE IMPROVED STRUCTURE FOR REDUCING FUEL CONSUMPTION AT HIGH SPEEDS, COMPRISING:
d. an elongated cross slot through the front of the bed floor to vent air from under the bed to behind the cab.

2. The invention as defined in claim 1 with an additional limitation of
e. a grating in said slot.

3. The invention as defined in claim 1 wherein said slot
e. extends at least three-fourths the distance from side wall to side wall, and
f. said slot is in the front one-fourth of the floor length.

4. The invention as defined in claim 3 with an additional limitation of
g. a grating in said slot.

* * * * *